(12) United States Patent
Miranda et al.

(10) Patent No.: US 9,178,791 B2
(45) Date of Patent: Nov. 3, 2015

(54) SYSTEM AND METHOD FOR DATA ACQUISITION IN AN INTERNET PROTOCOL NETWORK

(75) Inventors: Carlos Miranda, Deerfield Beach, FL (US); Alan Tai, Hillsborough, NJ (US)

(73) Assignee: ITXC IP Holdings S.a.r.l., Luxembourg (LU)

( * ) Notice: Subject to any disclaimer, the term of this patent is extended or adjusted under 35 U.S.C. 154(b) by 312 days.

(21) Appl. No.: 13/219,847

(22) Filed: Aug. 29, 2011

(65) Prior Publication Data

US 2013/0054737 A1 Feb. 28, 2013

(51) Int. Cl.
*G06F 15/16* (2006.01)
*H04L 12/26* (2006.01)
*H04L 12/931* (2013.01)

(52) U.S. Cl.
CPC .............. *H04L 43/12* (2013.01); *H04L 49/602* (2013.01)

(58) Field of Classification Search
CPC ..... H04L 41/22; H04L 63/10; H04L 41/5022; H04L 43/045; H04L 43/0811; H04L 41/0893; H04M 7/006; H04M 3/2236; H04M 3/2254; H04M 3/2281; H04M 3/42221
USPC ................................................ 709/224, 227
See application file for complete search history.

(56) References Cited

U.S. PATENT DOCUMENTS

| | | | | |
|---|---|---|---|---|
| 6,954,904 | B2* | 10/2005 | White | 715/763 |
| 7,411,915 | B1* | 8/2008 | Spain et al. | 370/250 |
| 8,165,114 | B2* | 4/2012 | Halbraich et al. | 709/224 |
| 8,195,661 | B2* | 6/2012 | Kalavade | 709/224 |
| 8,775,571 | B2* | 7/2014 | Srinivasan et al. | 709/220 |
| 8,823,878 | B2* | 9/2014 | Keener et al. | 348/723 |
| 2007/0266149 | A1* | 11/2007 | Cobb et al. | 709/224 |
| 2009/0138593 | A1* | 5/2009 | Kalavade | 709/224 |
| 2009/0177771 | A1* | 7/2009 | Britton et al. | 709/224 |
| 2010/0054117 | A1* | 3/2010 | Southworth et al. | 370/216 |
| 2010/0313009 | A1* | 12/2010 | Combet et al. | 709/224 |
| 2011/0167156 | A1* | 7/2011 | Mani et al. | 709/224 |
| 2012/0054427 | A1* | 3/2012 | Huang et al. | 709/238 |
| 2012/0117654 | A1* | 5/2012 | Yalakanti | 726/25 |

* cited by examiner

*Primary Examiner* — Phuoc Nguyen
(74) *Attorney, Agent, or Firm* — Kaplan Breyer Schwarz & Ottesen, LLP

(57) ABSTRACT

A communication network system for monitoring data traffic is disclosed, in which at least one switch serving as an intermediary to a plurality of data input streams and a plurality of data output streams; a capture server in communication with the switch; and a data acquisition control engine operable to receive data acquisition instructions from a user and cause the received instructions to be implemented at the switch.

23 Claims, 9 Drawing Sheets

| USER DATA 112 | NETWORK DATA 114 | |
|---|---|---|
| | SWITCH DATA | DEVICE DATA |
| Customer 1<br>    Voice data | Switch 310, Port 1<br>VLAN ID '12' | VOIP Active Card 412 |
| Customer 2<br>    Internet Browsing data | Switch 320, Port 1<br>VLAN ID '14' | Other Device 1 |
| No Data  (Connection Idle) | Switch 320, Port 2 | VOIP Standby Card 414 |

| USER DATA 112 | NETWORK DATA 114 | |
|---|---|---|
| | SWITCH DATA | DEVICE DATA |
| No Data (Connection Idle) | Switch 310, Port 1 | VOIP Active Card 412 |
| Customer 2<br>Internet Browsing data | Switch 320, Port 1<br>VLAN ID '14' | Other Device 1 |
| Customer 1<br>Voice Data | Switch 320, Port 2<br>VLAN ID '12' | VOIP Standby Card 414 |

| USER DATA 112 | NETWORK DATA 114 | |
|---|---|---|
| | SWITCH DATA | DEVICE DATA |
| Customer 1<br>Voice data | Switch 310, Port 1<br>VLAN ID '12' | VOIP Active Card 412 |
| Customer 1<br>Voice Data | Switch 320, Port 2<br>VLAN ID '12' | VOIP 'Standby' Card 414 |

SYSTEM AND METHOD FOR DATA ACQUISITION IN AN INTERNET PROTOCOL NETWORK

BACKGROUND OF THE INVENTION

When operating large, complex communication networks it is desirable to monitor data traffic. Reasons for such monitoring may include troubleshooting, quality monitoring, assuring the security of protected information, metering data traffic, and so forth. Implementing such monitoring in networks with a large number of devices and which extend over large distances can be challenging. Various existing approaches have been used to address this matter.

One existing approach involves the use of taps. A tap may be physically installed within a communication path and, once installed, is operable to copy all data transmission occurring within the tapped path to a server which can receive and store the copied data, or which may analyze the data in real time. However, installing taps at various points of interest within a large, distributed network is cumbersome and expensive.

Accordingly, there is a need in the art for improved systems and methods for data traffic monitoring within a communication network.

SUMMARY OF THE INVENTION

According to one aspect, the invention is directed to a communication network monitoring system that may include at least one switch serving as an intermediary to a plurality of data input streams and a plurality of data output streams; a capture server in communication with the at least one switch; and a data acquisition control engine operable to receive data acquisition instructions from a user and cause the received instructions to be implemented at the at least one switch.

According to another aspect, the invention is directed to a method that may include presenting a graphical user interface (GUI) to a user by a data acquisition control engine, in a communications network; receiving data acquisition instructions from the user that specify a data acquisition plan; deriving commands to issue to one or more switches based on the data acquisition plan; and transmitting the derived commands to the one or more switches.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4 is a tabular schematic illustration of a portion of database for correlating user data to network data in accordance with an embodiment of the present invention;

FIG. 5 is an illustration of the database of FIG. 4 with the correlation of user data to network data having been modified to reflect a change in operation of the system of FIG. 2, in accordance with an embodiment of the present invention;

FIG. 6 is an illustration of the database of FIG. 4 with the correlation of user data to network data having been modified to reflect a change in operation of the system of FIG. 2, in accordance with an embodiment of the present invention;

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

The technology disclosed herein may provide an intelligent, automated, and centrally controllable system and method for monitoring data traffic from, through, and to a range of communication devices, including but not limited to VOIP (Voice Over Internet Protocol) equipment. The use of user-friendly computer interfaces, flexibly controllable equipment, and databases linking various user-defined data flow criteria to network hardware characteristics can alleviate any need for a user to maintain records of port numbers, and other network hardware details while still enabling the user to obtain data traffic information sought by, and useful to, the user. Moreover, the systems and methods for screening out unhelpful data from the data sought by the user may be distributed over a plurality of system devices, as needed, so as to enable relatively simple and inexpensive hardware to be used while still providing highly selective and user-specific data flow monitoring information. The above features are elaborated upon in the discussion below.

Figure 1:
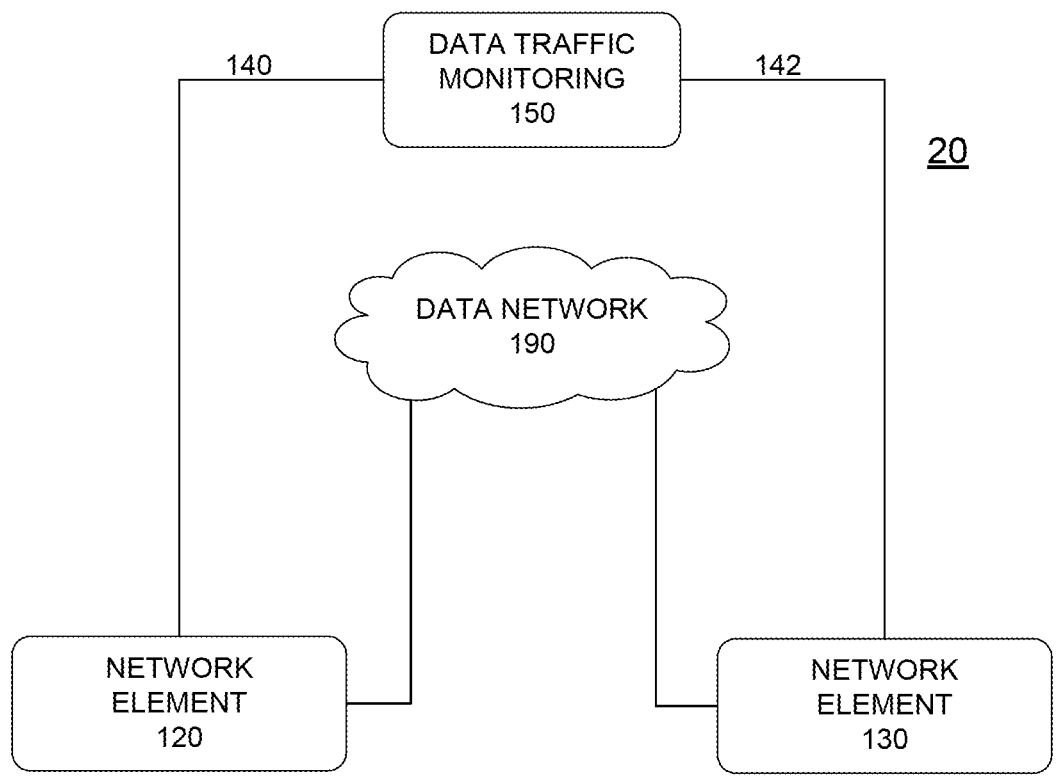
FIG. 1 is a block diagram of a communications system including exemplary communications equipment coupled to a data network and to data traffic monitoring equipment in accordance with an embodiment of the present invention.
Figure 2:
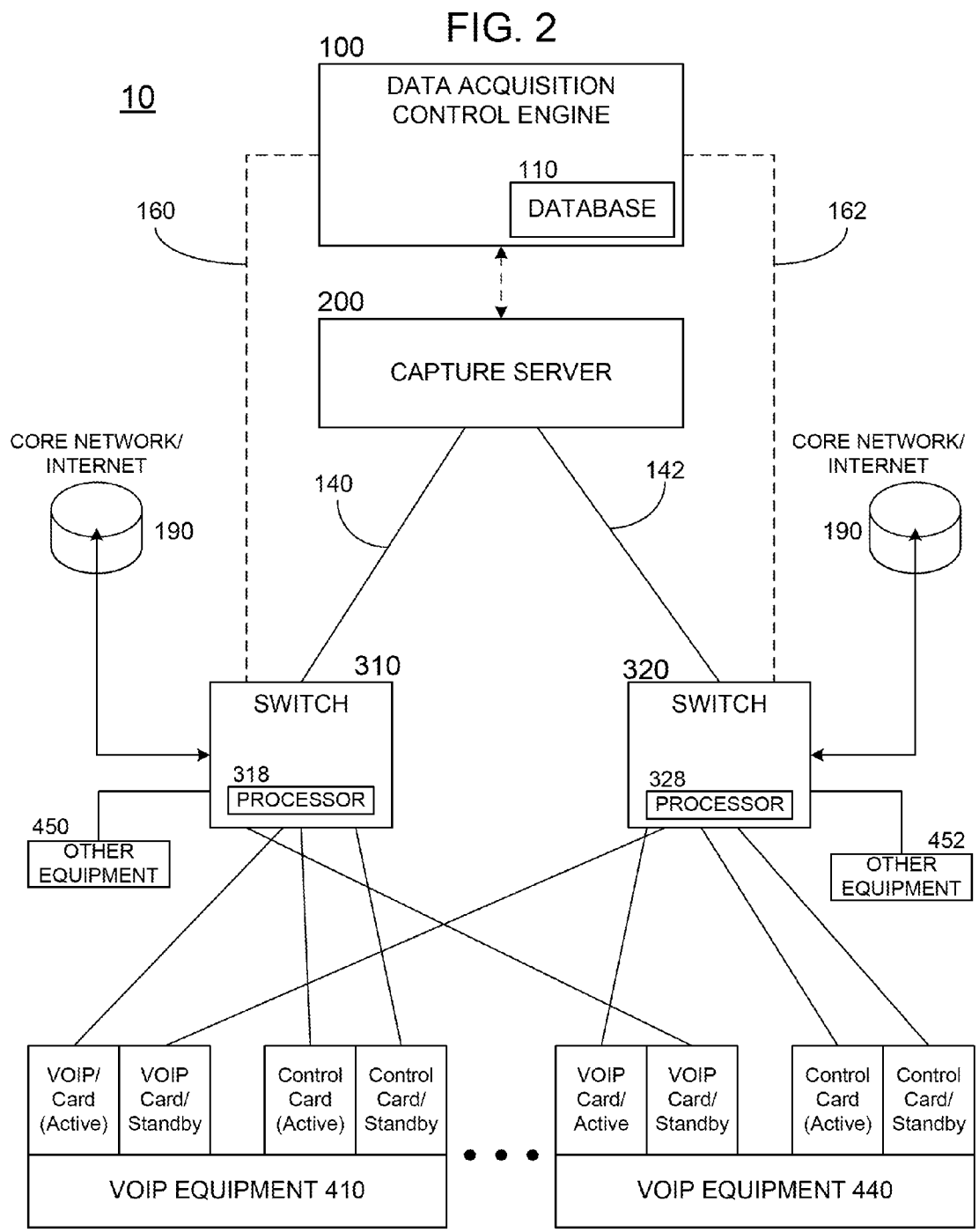
FIG. 2 is a block diagram of a data acquisition and troubleshooting system in accordance with an embodiment of the present invention.

FIG. 1 is a block diagram of communications system 20 which may include network element 120, network element 130, data network 190, and/or data traffic monitoring system 150. Network elements 120 and 130 may be any network devices capable of serving as intermediaries for communication and/or capable of communicating with data network 190. Network elements 120 and 130 may be capable of receiving and/or transmitting a variety of types of data including but not limited to voice data, text data, music and video. Data network 190 may be the Internet or other type of wide area network. Data traffic monitoring system 150 may include a plurality of constituent elements such as capture server 200 (FIG. 2) and/or data acquisition control engine 100 (FIG. 2).

However, data traffic monitoring system 150 is not limited to the use of the above-listed devices.

In one embodiment, network elements 120 and 130 may be linked to data network 190 employing conventional data communication links. Network elements 120 and 130 may also be connected to data traffic monitoring system 150 over communication links 140 and 142, respectively. Data communication links 140, 142 may form part of a proprietary network that is physically separate from data network 190. However, alternatively, data communication links 140, 142 could form part of data network 190 and be protected from unauthorized access by use the encryption, passwords, and/or other security features.

The system shown in FIG. 1 may be operable to enable data traffic monitoring system 150 to monitor data traffic through network elements 110 and 120. Upon receiving monitoring data from network elements 120 and 130, data traffic monitoring system 150 may apply user-specified screening criteria to the received data to extract from the data traffic flow only that data of interest to a particular user. The various parts of system 20 are discussed in greater detail below in connection with FIG. 2.

FIG. 2 is a block diagram of a portion of a VOW system 10 including an acquisition and troubleshooting system in accordance with an embodiment of the present invention. VOIP system 10 may include data acquisition control engine (DACE) 100, capture server 200, a core network which may be the Internet 190, switches 310, 320 (also referred to collectively as switches 300) or any number of switches in a physical location, and/or VOIP equipment packages 410 and 440. It is noted that any number of VOIP equipment packages similar to VOIP equipment package 410 may be employed in connection with various embodiments of the present invention. DACE 100 may include database 110.

Data acquisition control engine 100 and capture server 200 may be general purpose personal computers (PCs), such as the computer shown in FIG. 4, configured and programmed to fulfill the functions described herein. Alternatively, control engine 100 and/or server 200 could be special-purpose computers employing hardware and/or software customized for performing the methods described herein. Switches 310, 320 may be suitably selected Juniper or CISCO network switches. However, the invention is not limited to this selection of switches. Switches 310, 320 may be any suitable network elements. VOIP equipment packages 410, 420 may be GSX devices. However, other network or communication devices, including digital communication devices, may be connected to switches 310, 320.

We now direct attention to the physical layout of the various devices shown in FIG. 2. In one embodiment of VOIP system 10, a single DACE 100 is deployed and may be located at a suitably selected central location, which may, for instance be in New Jersey, or other suitable location. A plurality of Points of Presence (POPs) may be placed in communication with DACE 100, and may be located anywhere in the world. In one embodiment, each point of presence may include one capture server 200. However, where desired, more than one capture server 200 may be present within a single point of presence. In an alternative embodiment, a capture server 200 may be integrated with a DACE 100 and may be used instead of, or in addition to, one or more capture servers located at one or more respective points of presence.

Within each point of presence, the capture server 200 may be placed in communication with equipment to be monitored, including but not limited to switches such as switches 310 and 320 shown in FIG. 2. In one embodiment, each capture server may be operable to service (i.e. to be in communication with and to monitor) one or a plurality of switches 300. A point of presence may typically include about ten switches. However, fewer or more than ten switches may be included within a single point of presence, be placed in communication with, and/or be monitored by a capture server 200. Each switch 300 may be connected to other switches, other networks, and/or to one or more IP devices such as, but not limited to, VOIP equipment such as VOIP equipment packages 410, 440.

Where a capture server 200 is located within a point of presence, there may be a direct connection between switches 300 and the capture server 200. The ports on switches 300 may be configured as 10-gigabit (GB) Ethernet connections.

The system of FIG. 2 provides an intelligent, flexible system for mirroring port data that enables a user to provide data acquisition instructions to data acquisition control engine 100. A user-friendly graphical user interface (GUI) may be provided in connection with control engine 100 to enable the user to enter instructions in a convenient manner. The instructions may operate to instruct a switch 310 or 320 to mirror data received at a specified port of a specified switch (such as switch 310) to capture server 200. After receiving the user instruction via use of a GUI, or other suitable data entry mechanism, control engine 100 can then transmit suitable control instructions to a switch (such as switch 310) and to a capture server (such as capture server 200) to begin the mirroring, filtering, and data acquisition processes. The totality of the instructions provided by a user to control engine 100, that specifies the device, port, or type of data traffic to be mirrored, captured, and/or filtered, and optionally a specification of a time period over which the mirroring process will take place may be referred to herein as a "data acquisition plan."

Figure 7A:
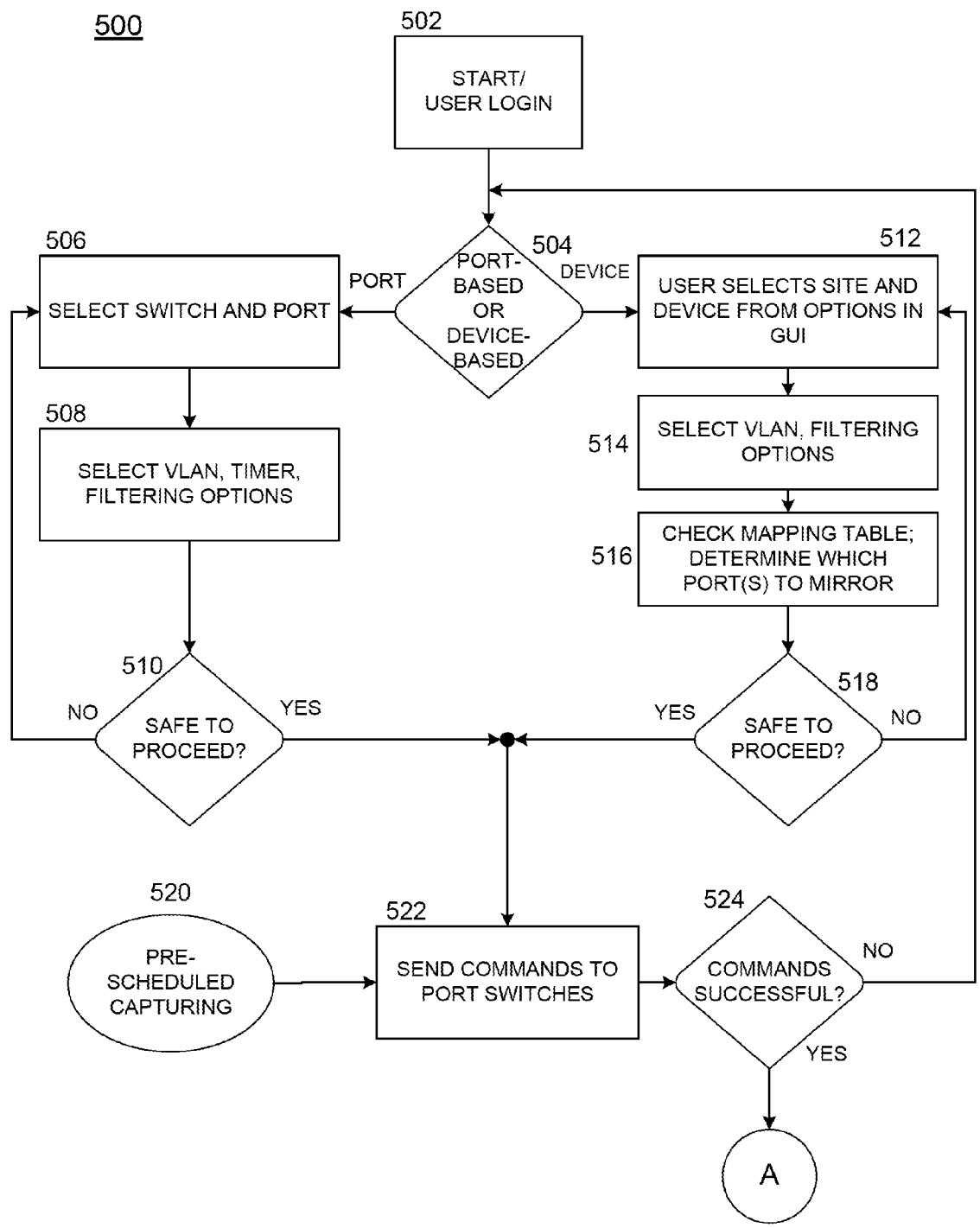
FIG. 7A and FIG. 7B are flow diagrams of successive portions of a method for acquiring data in accordance with an embodiment of the present invention.
Figure 7B:
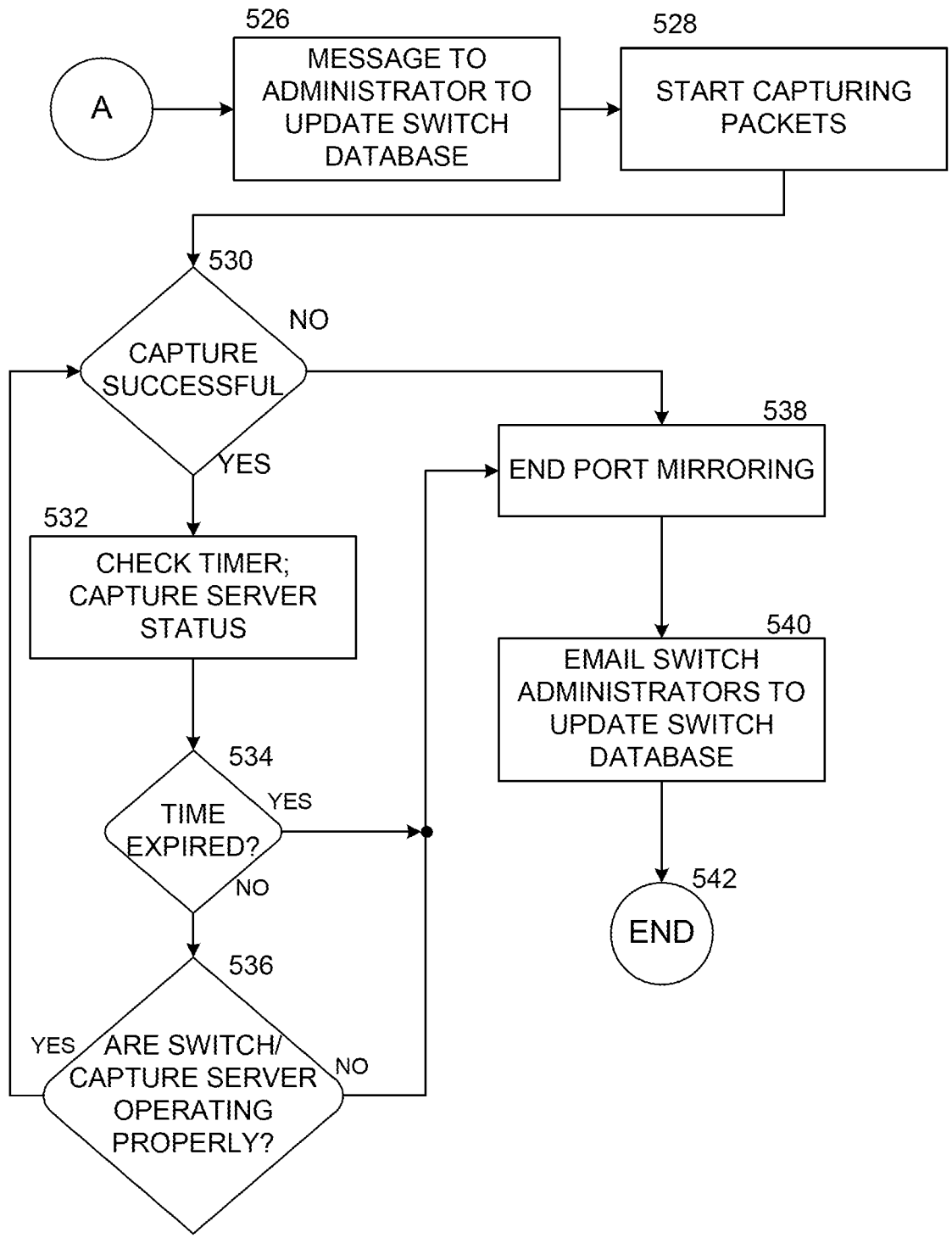

We now direct attention to process of distributing instructions for mirroring data and filtering data, and the mirroring and filtering processes themselves. The process is described generally in this section, followed by a more detailed discussion in connection with the flowcharts of FIGS. 7A and 7B. In one embodiment, DACE 100 may transmit instructions for both (a) mirroring data at a switch 300 and for (b) filtering data at capture server 200 to capture server 200. Thereafter, capture server 200 may further transmit the instructions for data mirroring to switches 300 using links 140 and/or 142.

In alternative embodiment, DACE 100 may transmit the filtering instructions separately from the mirroring instructions. Specifically, DACE 100 may transmit the filtering instructions to capture server 200 over the link coupling DACE 100 and capture server 200. DACE 100 may separately transmit mirroring instructions to one or more of switches 300 using links 160 and/or 162, shown with dashed lines in FIG. 2.

Selected operational characteristics of the system of FIG. 2 are presented here to aid an understanding of the data screening process that follows. It is noted that switches 300 may include a plurality of ports, and that a particular switch 300 may be operable to act upon an instruction to copy a stream of data being received at a particular port on a switch 300 to capture server 200, or to another selected device. Moreover, VOIP equipment packages 410 and 440 may add "tags" to each packet of data passing therethrough, which tags are referred to herein as Virtual Local Area Network (VLAN) tags. The VLAN tags may operate to mark the data as being of a particular "type" such as voice data, ordinary computer text data, music data, video data, among others. The correlation between a VLAN tag value and a data type may be maintained in one or more databases distributed as needed among devices throughout the system of FIG. 2. Database 110 of DACE 100 may be one of these databases. However, the invention is not limited to employing just one database, or to having the database(s) located within or near any one particular processing device.

In one embodiment, the correlation between a particular port on switch 310 and the number (or other port identification type) of the port on VOIP equipment package 410 in communication with the particular port on switch 310 (or other switch) may be manually entered into a database accessible to DACE 100. However, in an alternative embodiment, the above-described switch-port to VOIP-port connection data may be determined dynamically by DACE 100.

In one embodiment, the data passing through one of switches 300 may be subjected to two or more successive screening steps to most effectively extract the data-traffic monitoring information of greatest value to the user. A first screening step may be that of specifying mirroring data which may be used to conduct screening at one or more of switches 300. Mirroring instruction data may include two main components: (1) switch and port selection; and (2) VLAN selection. Thus, an instruction pertinent to mirroring to be conducted at a switch 300 may include a specification of which switch and port to mirror data from and a specification of a VLAN tag. However, if for any reason, a user wishes to mirror all data received at a specified port on a switch 300, the VLAN tag information could be omitted.

Having selected a switch, a port, and a VLAN tag value for the data to be mirrored (referred to herein as the "target data"), it remains to describe the mirroring process itself. The mirroring process may include sending a copy of all of the target data to capture server 200, while leaving the original data traffic, from which the target was copied, undisturbed. Leaving the original data traffic undisturbed may include (a) ensuring that the original data itself is neither altered nor corrupted in any way; and/or (b) ensuring that the schedule of data transmission to the original destination port for the data traffic being copied is also undisturbed.

A second data screening step is referred to herein as filtering and may be conducted at capture server 200. Capture server 200 may further screen the data received from the switch-ports being mirrored by filtering the received, copied data using various filtering parameters. Filtering parameters may include, but are not limited to, an IP address, a logical data port, among other suitable data parameters that may be included within the headers of data packets received by the capture server 200. Mirrored data that satisfies all of the filtering parameters (which is thus "mirrored, filtered data") may be stored at capture server 200 for later analysis. Alternatively, the mirrored, filtered data may be analyzed in real time.

The above-described two-stage process for screening data traffic to obtain data for analysis by DACE 100 beneficially enables VOIP system 10 to use relatively simple and inexpensive equipment for switches 300, instead of requiring sophisticated and expensive equipment therefor.

The present invention is not limited to employing capture server 200 to filter data mirrored from switches 300. For instance, in one alternative embodiment, filtering may be conducted at DACE 100. Moreover, in still other embodiments, still other devices could be employed to filter the mirrored data sent from one of switches 300.

The system includes a database that provides a layer of abstraction to users from the complexity due to the large number of interconnections between network devices (e.g., switches 300 and VOIP equipment 410-440). The database may be stored in capture server 200 and/or data acquisition control engine 100, or at least accessible to capture server 200 and/or control engine 100, stores data that includes (but is not limited to) associations or mappings between specific port numbers on different devices, device types, specific device identifiers, types of data traffic found throughout the communications network 2. For example, the database may store the association and/or connections between physical ports on the various switches 300 and VOIP equipment 410 to more user-friendly data such as the type of data traffic the user seeks to mirror; the device types coupled to the respective ports; and/or the identification of specific devices supplying data to the respective ports. Employing the port-to-data-source mappings discussed above and the GUI, a system and method in accordance with the present invention relieves the user of the need to know the numbers of the ports designated to serve as sources and destinations of mirrored data.

In one embodiment, a VOIP equipment package 410 (which may be a GSX device) includes VOIP card pairs. Specifically, for every active VOIP card, VOIP equipment package 410 may include a standby VOIP card for redundancy. In one embodiment, the active VOIP card may actively transmit data, while the other paired VOIP card will be in standby mode, waiting for a failure of the active VOIP card. Upon occurrence of a failure or other type of unavailability of the active VOIP card, the standby VOIP card may start operating as the active VOIP card. At any given moment, a user may not know which switch the customer traffic is flowing through because the user will not know which card on GSX 410 is the "active" VOIP card. As a result, the user may also not know which port on a switch to monitor.

In one embodiment, the DACE 100 is configured to know which of the VOIP cards on a VOIP equipment package (either 410 or 440) is active (by virtue of its interaction with switches 310 and/or 320, and will therefore know which switch 310 or 320 to conduct active mirroring on to capture the correct customer traffic. Specifically, in this embodiment, the DACE 100 can identify the correct active port(s) on the switch 300 to mirror when the user provides the DACE 100 with a PoP location, VOIP equipment id, and VLAN id. When using this approach, the user does not have to know which ports on the VOIP equipment are actively sending data having the VLAN ID of interest to the use. The user also does not have to know which ports on the pertinent switch are receiving the data from the VOIP equipment.

In an alternative situation, VOIP equipment ports on both the active and standby VOIP cards may send customer traffic to both switches 310, 320. In this case, the customer traffic received at the ports of both of switches 310 and 320 may be mirrored, regardless of whether the switch-port of switches 310, 320 is connected to an active or standby VOIP card.

Figure 3:
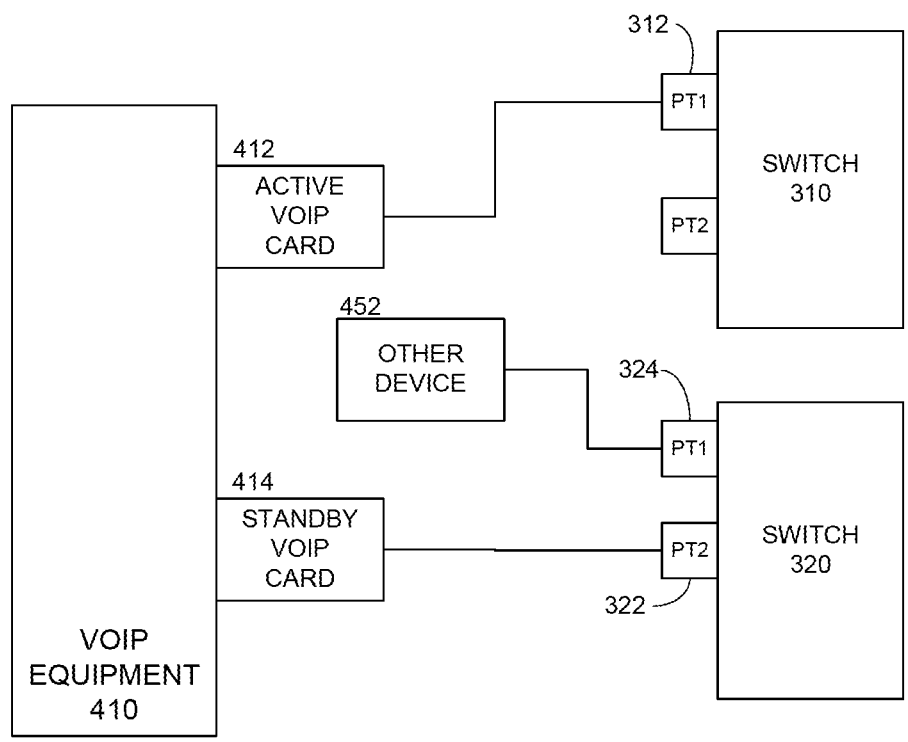
FIG. 3 is a block diagram of a portion of the system of FIG. 2 showing one VOIP equipment package and two switches coupled thereto, in accordance with an embodiment of the present invention.

FIG. 3 is a block diagram of a portion of the system of FIG. 2 showing VOIP equipment package 410, other device 452, and switches 310 and 320, in accordance with an embodiment of the present invention. FIG. 3 shows a set of communication links between VOIP equipment package 410 and switches 310 and 320 that may remain substantially fixed over time. However, as discussed below, methods of using the links and the switches by VOIP equipment package 410 may vary along with the needs of VOIP equipment package 410, and/or system 10 as a whole.

FIGS. 4 and 5 are diagrams of data tables that may form a portion of database 110 of DACE 100. FIGS. 4 and 5 are intended to provide a simplified illustration of how database 110 of DACE 100 can beneficially associate user-friendly data of the type shown in the leftmost column of FIGS. 4 and 5 with the more detailed network data 114 shown in the second and third columns, which would be inconvenient to require a user to record and/or memorize.

The table of FIG. 4 shows the connections to, and the type of data traffic to, each of three ports on switches 310 and 320 in the configuration shown in FIG. 3. FIG. 5 shows the correlation of user data to network data for the hardware of FIG. 3 under a different data transmission operating condition. FIG. 6 shows yet another operating condition for the hardware of FIG. 3. FIGS. 4, 5, and 6 show, among other things, the user data transmission to each of port 1 on switch 310 and port 2 of switch 320 for (a) the standard "active" mode of operation; (b) the standby mode of operation; and (c) the load-sharing mode of operation. The data included in FIGS. 4-6 also helps illustrate a subset of the data that may be included in database 110 of DACE 100. Moreover, the changes to the data in progressing through FIGS. 4-6 help illustrate changes to database 110 that may be implemented as data communication arrangements change within system 10.

FIG. 4 shows VOIP equipment package 410 operating in an active mode. More specifically, VOIP active card 412 is transmitting voice data (which has been assigned a VLAN ID value of "12" for this exemplary case) to port 1 of switch 310. The connection leading out of VOIP standby card 414 toward port 2 on switch 320 is idle. Other device 452 is transmitting/receiving internet browsing data to port 1 on switch 320. The data from customer 2 is included to help illustrate that different types of data may be identified in database 110. The communication between device 452 and port 1 on switch 320 does not directly affect the various data transmission arrangements between VOIP equipment package 410 and switches 310 and 320.

FIG. 5 shows an altered operating condition in which a problem has been encountered by the connection between VOIP active card 412 and port 1 on switch 310. Thus, in the data table of FIG. 5, voice data for customer 1 is being transmitted from VOIP standby card 414 to port 2 on switch 320. And, in this case, the connection between VOIP active card 412 and port 1 on switch 310 is idle, and possibly awaiting repair. The change in the operating condition of VOIP equipment package 410 and switches 310 and 320 may be input to database 110 manually, i.e. by having a human user enter the data using a GUI. Alternatively, database 110 may be updated automatically upon disabling VOIP active card 412, and activating VOIP standby card 414. In one embodiment, DACE 100 becomes aware of the transfer of data communications from card 412 to card 414 so that updated mirroring instructions can be transmitted to switches 310 and 320. In this embodiment, the DACE 100 may effect a change in mirroring instructions to switches 310 and 320 quickly enough so that none of the data transferred out of VOIP active card 412 and VOIP standby card 414 is missed by the mirroring operations being conducted within system 10. More specifically, in the embodiment of FIG. 5, to successfully mirror all voice data from customer 1 to capture server 200, mirroring may be turned on at port of switch 320 and turned off at port 1 of switch 310.

FIG. 6 shows yet another operating condition for the connections shown in FIG. 3. FIG. 6 shows user data 112 and network data 114 consistent with a load balancing condition. In this situation, both VOIP active card 412 and VOIP standby card 414 transmit voice data from customer 1 simultaneously to port 1 of switch 310 and port of switch 320, respectively. In this case, to mirror data from customer 1, without missing anything, mirroring may be turned on at port 2 of switch 320 while maintaining the mirroring operation at port 1 of switch 310. Thus, continuing to fully capture the voice data from customer 1 would involve mirroring both port 1 of switch 310 and port 2 of switch 320 simultaneously.

The contents of database 110 may change in response to the change in operations described above, in which voice data from customer 1 goes from being transmitted exclusively out of VOIP card 412 to being simultaneously transmitted out of both VOIP card 412 and VOIP card 414. In one embodiment, a human operator may manually enter changes into a terminal to update database 110 to reflect changes in the operational status of VOIP cards 412 and 414, or other devices within system 10, changes in the equipment included in system 10, and/or changes in hardware connections between network elements within system 10. In another embodiment, data reflecting operational changes, changes in network elements deployed within system 10, and/or changes in connections between network elements within system 10 may be automatically entered into database 110 of DACE 100, without a need for human intervention.

The above is directed to an example involving voice in which the two ports being mirrored both receive, and mirror, data having the same VLAN tag value. However, the invention is not limited to this arrangement. In other situations, a plurality of data types having a respective plurality of VLAN ID values could be transmitted to one or both of ports 312 and 322. Moreover, the data types (and therefore VLAN tag values of the data) need not be the same for data transmitted to the two different switches. Further, the data traffic rate need not be equally distributed among the two ports. If, for example, card 412 approaches an overload condition (which could, for example, occur at 10 gigabits/sec), a portion of the data traffic could be transferred from card 412 to card to 414, though the amount transferred need not equal 5 gigabits per second. A transfer of any quantity of data traffic sufficient to alleviate a potential overload condition at card 412 (or any other card the traffic is initially being transmitted through) may be implemented.

Since there are numerous ports, and the coupling between specific port numbers and the devices that specific ports receive data from may change over time, the burden on the user is greatly diminished by removing the need for the user to keep lists of port numbers to be mirrored. As discussed above, database 110 of DACE 100 may be substantially continuously updated to reflect the communication status of VOIP cards (and other devices) such as being active or inactive, connection mappings between various communication devices within system 10, as well as the addition and/or removal of devices from system 10. Moreover, embodiments of the present invention enable setting schedules for port mirroring to be entered into DACE 100 by the user and to be subsequently implemented by capture server 200 and switches 310, 320 rather than imposing a requirement that the user remember to start and stop mirroring specific ports at specific points in time. This prevents mirroring operations from accidentally being left in place beyond the period over which the data is useful for debugging purposes and reduces the chance of imposing a significant computational and data transmission burden on various devices within VOW system 10 and data network 190.

The data mirrored from one of switches 310 or 320 (or other device) may be directed capture server 200. Thereafter, capture server 200 may store the mirrored data for later analysis. Alternatively, capture server 200 could analyze mirrored data as the data is received at capture server 200 from switch 310 (or other switch).

FIG. 3A and FIG. 3B are flow diagrams of successive portions of a method 500 for acquiring data in accordance with an embodiment of the present invention. At step 502, the method starts with the user logging in to the system, which may include logging into control engine 100. At step 504, the system may prompt the user to select data for mirroring by specifying a port, or by specifying a device, and having the control engine 100 map the device selection to a port of a particular switch. Decision block 504 decides which among two groups of steps is to be performed. A first group: steps 512, 514, and 516 are for ordinary users. A second group of steps: 506 and 508 provide more powerful and extensive access to system 10, and are available only to users with more privileged access.

If the user selects the port-based option, the user selects the switch and port at step 506. At step 508, the user may select the parameters for mirroring, wherein the parameters may include one more of: identity of a VLAN (Virtual Local Area Network), and a physical port on the switch; or any other suitable parameter, and then submit the request. The user may also select the parameters for filtering the mirrored data captured at the capture server 200, wherein the filtering parameters include one or more of: an IP address, a logical data port, or any other suitable data parameter. Further, the user may specify a time period over which data mirroring will occur from the selected port.

The time period over which data from a specified port may be mirrored and filtered may be specified manually or may arise automatically in response to a programmed schedule for mirroring and filtering. In the case of manually specified operation, a user may enter a requested start time and a requested stop time using a suitably configured graphical user interface (GUI) operable to transmit the start and stop times to DACE 100. Alternatively, a user may press a "start" button to cause mirroring and filtering to begin substantially immediately upon the pressing of the button, and thereafter press the same or another button (which may be any key on a standard computer keyboard) to stop the mirroring/filtering operation.

Alternatively, an automatic approach may be employed. To enable operation of an automatic mode of operation, scheduling data for mirroring operations may be incorporated into database 110, which data may include start and stop times which may be expressed in standard 24-hour clock time, 12-hour clock time, or any other suitable time keeping system. Database 110 may further include a specification of the frequency of data mirroring/filtering within successive cycles of the 24-hour clock period (or other period), such as once a day, once a week, or other period. When a clock within, or in communication with, DACE 100 reaches a start time, whether specified manually or automatically, DACE 100 may transmit mirroring instructions and filtering instructions to capture server 200. Capture server may then re-transmit the mirroring instructions to one or more switches specified by the DACE 100. Mirroring and filtering may then proceed for the duration of the specified period. Upon reaching the stop time (whether resulting from a user-specified stop time, or a programmed stop time), the DACE 100 may send instructions to the capture server 200 to discontinue the data capture operation, and the capture server 200 may re-transmit the mirroring instructions to the switches conducting the mirroring operation(s).

At step 510, engine 100 may review the user request (also referred to herein as an instruction) and determine whether or not engine 100 and system 10 are able to service the user request. At step 510, the system determines whether devices in system 10 are able to implement mirroring as requested in steps 506-508. More specifically, DACE 100 may determine whether the switches specified in step 506 can handle the computational and data-transmission burden of the requested mirroring operation. If the DACE 100 determines that the burdens imposed on the switches are acceptable (e.g., processor load burdens), the method may continue at step 522. If the DACE 100 determines that the burden on the requested switch(es) is not acceptable, the data capture operation does not proceed. Instead, the DACE 100 may repeat its enquiry into the ability of the switches to handle the pertinent burden at various time intervals. The DACE 100 may also notify the user of the problem and prompt the user to initiate the data mirroring operation at a future time.

If the answer to the query in block 510 is "no," the DACE 100 may repeatedly conduct the enquiry into system capabilities until either a time limit is reached, until a maximum number of retries is reached, or until the DACE discovers that system 10 is ready for the mirroring to proceed. Data specifying the time limit and/or maximum number of retries (of enquiries into the ability of switches to handle the mirroring request) may be included in database 110, and may be accessed as needed by the DACE 100. This time-limit and maximum-retry-number data may be set and modified as desired by a suitably qualified user.

If the query of decision block 510 leads to a conclusion that processor loads are at acceptable levels, and the mirroring process proceeds, DACE 100 may nevertheless continue to check the processor loads during the mirroring process to ensure that processor loads remain below an acceptable threshold. If the pertinent processor load thresholds are reached or surpassed during the mirroring process, the DACE 100 may prematurely halt the mirroring process to avoid overloading the processors.

In this section, we address the above reference to "processor loads." Various processors may be distributed throughout system 10 including at a central location that may include DACE 100, as well as at the various points of presence that may include one or more capture servers 200, switches 310 and 320, and possibly within various network elements such as, but not limited to, VOIP equipment packages 410, and 420, among others. It is not practical to show all such processors in FIG. 2. However, it is to be understood that each network element, such as switches, VOIP equipment packages, among others, may each employ one or more processors that are subject to being overloaded, depending upon the workload imposed thereon. The DACE 100 may check the loading of such processors, as needed, prior to starting a mirroring process to determine whether to allow a mirroring process to begin. Moreover, DACE 100 may continue to check the loads of these distributed processors during a mirroring process to determine whether it is safe to allow the mirroring process to continue. Further, DACE 100 may check the processor loads at any other time to assess the overall operation of system 10, and possibly to accumulate data describing processor loads over time to generate archival information that may be useful in scheduling future mirroring operations.

While it is not feasible to show, in FIG. 2, all of the processors that may be distributed throughout system 10, processors 318 and 328 are shown disposed within switches 310 and 320 respectively. Switches 310 and 320 may, but need not, include processors 318 and 328 as shown.

It is noted that two different forms of overloading may be beneficially enquired into by DACE 100. A first type is the processor overloading discussed above. A second type is data-transmission overloading such as the type that may occur at VOIP active card 412 and/or VOIP standby card 414. It is noted that data-transmission overloading may occur at other network elements within system 10, including but not limited to switches 310 and 320. In one embodiment, DACE 100 may be operable to check for both processor overloading and data-transmission overloading when determining whether to allow a mirroring operation to start or to continue a mirroring operation that is already in progress.

Turning to the other side of decision triangle 504, if the user data acquisition instruction is device based, control engine 10 may provides a list of sites, and of devices within each site, within a communication network to the user, using the GUI. We note that the "device" side of decision block 504 leads to operational blocks 512, 514, and 516 which may be performed by an ordinary user. It will be recalled that steps 506 and 508, on the "port" side of decision block 504 may be limited to use by users with more extensive access to control of system 10.

At step 512, the GUI may present a list of sites and a list of devices to the user. The user may then select one of the sites, and a device within the selected site. At step 514, the user may select a VLAN. Optionally, the GUI may prompt the user to set filtering options which may be implemented at the capture server 200 to further screen the data to captured. The filtering parameters may include but are not limited to: IP addresses, a logical data port, or other data parameter included in data headers present in data packets received by capture server 200. The user may further specify a time period over which data mirroring will occur from the selected port.

At step 516, system 10, and more specifically control engine 100 may consult a mapping table (which may form part of database 110 of DACE 100) accessible to control engine 100 to correlate the device selected in step 512 to a specific port on a specific switch within VOIP system 10. One or more ports may be mirrored employing this approach.

At step 518, the system determines whether devices in system 10 are able to implement mirroring as requested in steps 512-516. More specifically, DACE 100 may determine whether the switches specified in step 516 can handle the computational and data transmission burden of the request mirroring operation. If the DACE 100 determines that the burdens imposed on the switches are acceptable, the method may continue at step 522. If the DACE 100 determines that the burden on the requested switch(es) is not acceptable, the data capture operation may not proceed. Instead, the DACE 100 may repeat its enquiry into the ability of the switches to handle the pertinent burden at various time intervals. The DACE 100 may also notify the user of the problem and prompt the user to initiate the data mirroring operation at a future time.

If the answer to the query in block 518 is "no," the DACE 100 may repeatedly enquire into system capabilities until either a time limit is reached, until a maximum number of retries is reached, or until the condition of system 10 is amenable to allowing the mirroring process to proceed. Data specifying the time limit and/or maximum number of retries (of enquiries into the ability of switches to handle the mirroring request) may be included in database 110, and may be accessed as needed by the DACE 100. This time-limit and maximum-retry-number data may be set and modified as desired by a suitably qualified user.

If the query of decision block 518 leads to a conclusion that processor loads are at acceptable levels, and the mirroring process proceeds, DACE 100 may nevertheless continue to check the processor loads during the mirroring process to ensure that processor loads remain below an acceptable threshold. If the pertinent processor load thresholds are reached or surpassed during the mirroring process, the DACE 100 may prematurely halt the mirroring process to avoid overloading the processors.

At step 522, control engine 100 may send commands to one or more of port switches 310, 320 to initiate mirroring of the designated ports. In one embodiment, DACE 100 also sends commends to capture server to configure capture server to capture mirrored data from switch(es). At step 524, the method determines whether the commands directed toward switches 300 have been successful. If not, the method resumes at step 504. If the commands have been successful, the method continues at step 526 (FIG. 3B).

At step 520, DACE 100 may act upon pre-scheduled data capturing commands that recur automatically at specified times of a day, a week, etc. As with the user-driven capturing/mirroring instructions provided above, DACE 100 may check the processor loads at the mirroring locations specified in the pre-scheduled mirroring instructions to determine whether the processor loads will enable the mirroring to occur. If the processor loads are at acceptable levels, mirroring commands may be issued to the switches per the pre-scheduled instructions in step 522. The details of the mirroring and filtering processes were discussed in detail earlier in this document in connection with FIG. 2, and are thus not repeated in this section. At step 526, once commands have been transmitted to the switches and have been implemented, messages may be sent to switch administrators to inform them of the mirroring process(es). Moreover, the system database (which may be stored at a device in communication with control engine 100) may be updated to reflect the switch port mirroring status.

At step 528, data packets begin getting mirrored from the selected ports and getting captured at capture server 200. At step 530, the system determines whether the data capture has been successful or not. If the data capture has been unsuccessful, the method continues at step 538. If the data capture has been successful, the method continues at step 532.

At step 532, the system checks the expiration timer to determine whether any schedules for data acquisition have expired. The system may also check the operational status (also referred to as the health status) of capture server 200. If the time has expired (534) for a timed data acquisition operation, port mirroring ends at step 538. If the time has not expired (534), the system determines, in step 536, whether the switch and capture server are operating properly.

Once port mirroring ends at step 538, switch administrators may be notified of the termination of the mirroring process, by email or other means. Additionally, the switch database may be updated to reflect the termination of the port mirroring process. DACE 100 may terminate the mirroring process by transmitting an instruction to the switch(es) conducting mirroring operations to execute a command to stop mirroring within the pertinent switch(es). The methods then ends (542).

In the following, the benefits of various embodiments of the present invention are described. The systems and methods described herein offer flexibility in various respects. The system described herein may be used to capture any type of traffic, including but not limited to VOIP Signaling (H323, SIP, SIP-I, MGCP, IAX, etc); Voice over IP Media (Voice, Data, Fax, DTMF, etc); gaming; web traffic; and/or file sharing.

The systems described herein may be used for numerous applications including but not limited to support and troubleshooting; volume monitoring and metering; service quality monitoring; security monitoring; legal intercept, and/or session recording. Moreover, the system can be used on any switch and vendor as long as the switch supports mirroring and CLI-based commands.

Another benefit of the systems and methods disclosed herein is affordability: there is no need for network taps or costly proprietary, custom-built systems. This system enables a reduction malfunctions arising from human error. The user/operator is presented with a GUI that conceals extensive detail such as the detailed mapping of switch ports to particular devices. Thus, the user is spared the need to recall, or separately store, this level of detail, and instead may define the data to be copied as a function of the type of data traffic, the device from which the data originates, among other factors which are disclosed elsewhere herein. The mapping between port numbers and specific devices may be managed by the data acquisition control engine 100 in a manner that is opaque to the user.

Moreover, the system offers safety. Specifically, the system may be restricted to pre-defined access that limits the burden on the existing switches, thereby reducing the risk of overburdening the system. The system offers security: users do not need to log in to the network switch to start capturing data packets. Instead, the system may authenticate users using a centralized authentication server.

The system offers automatic management. The system may automatically stop capturing data after user-defined time intervals and/or in response to the occurrence of specific events such as but not limited to: power failures, a halt in the flow of data from the device whose data is being mirrored, among other events.

The system also provides greater efficiency. The system saves the organization time and money by eliminating the need to manually issue commands to multiple switches in multiple locations. The system may offer centralized management. The process of switch control can be managed all network switches and capture Servers from a single location and from a single computing device.

The system helps prevent switch failure. The system may automatically check the utilization of a network switch before enabling packet capture, in order to prevent switch failure. Likewise, the system disclosed herein may disable a data capture process immediately, if unusually high CPU usage is detected. In addition, the system may check the capture server storage and offload stored data to a storage device external to the capture server 200, if a utilization threshold is reached.

Figure 8:
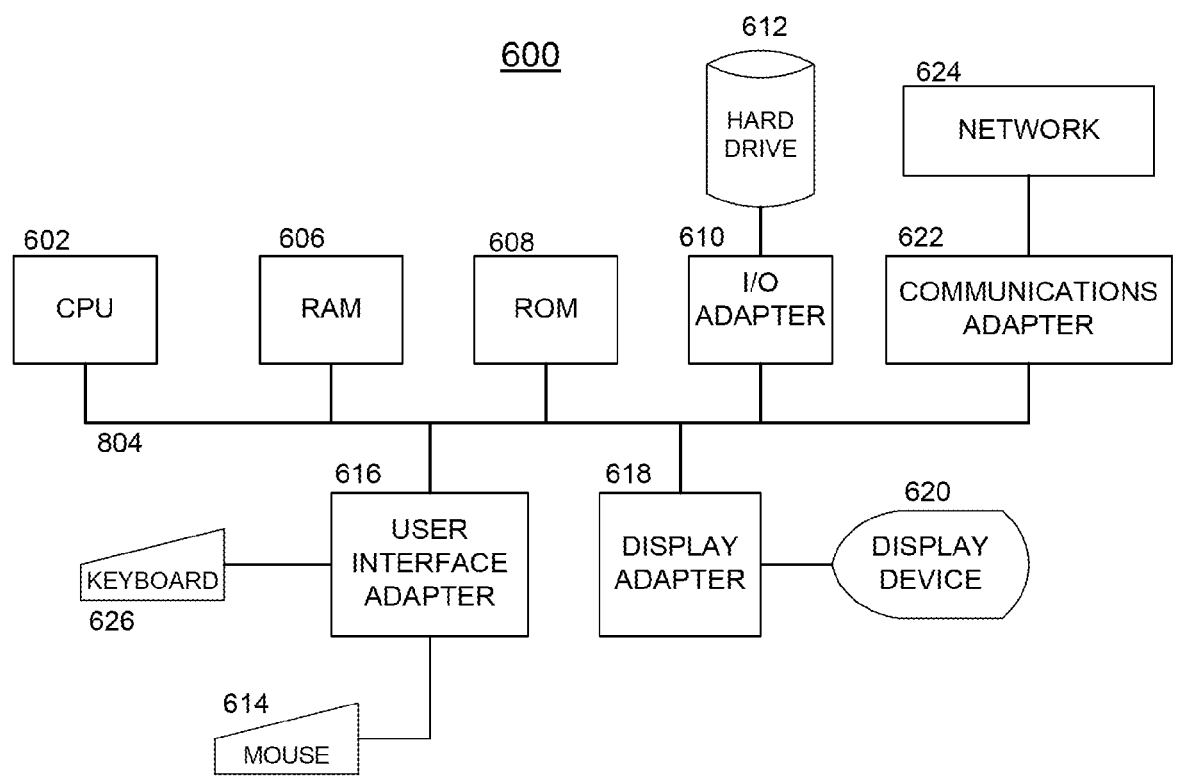
FIG. 8 is a block diagram of a computer system useable in accordance with an embodiment of the present invention.

FIG. 8 is a block diagram of a computing system 600 adaptable for use with one or more embodiments of the present invention. Central processing unit (CPU) 602 may be coupled to bus 604. In addition, bus 604 may be coupled to random access memory (RAM) 606, read only memory (ROM) 608, input/output (I/O) adapter 610, communications adapter 622, user interface adapter 606, and display adapter 618.

In an embodiment, RAM 606 and/or ROM 608 may hold user data, system data, and/or programs. I/O adapter 610 may connect storage devices, such as hard drive 612, a CD-ROM (not shown), or other mass storage device to computing system 600. Communications adapter 622 may couple computing system 600 to a local, wide-area, or global network 624. User interface adapter 616 may couple user input devices, such as keyboard 626, scanner 628 and/or pointing device 614, to computing system 600. Moreover, display adapter 618 may be driven by CPU 602 to control the display on display device 620. CPU 602 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A network monitoring system comprising:
   at least one network switch serving as an intermediary to i) at least one data input stream arriving on at least one port and ii) at least one data output stream, in a network;
   a capture server in communication with, and for capturing data from, the at least one network switch; and
   a data acquisition control engine that is configured to
      (i) receive a data acquisition instruction from a user, the instruction comprising a Voice over Internet Protocol (VOIP) equipment identification (ID) and a Virtual Local Area Network (VLAN) ID,
      (ii) based on the received data acquisition instruction, derive commands for the at least one network switch, including at least one port number that identifies the at least one port and that is based on the VOIP equipment ID and VLAN ID received,
      (iii) cause the received data acquisition instruction to be implemented on the at least one port at the at least one network switch according to the derived commands, and
      (iv) manage mapping between the at least one port number and specific devices in a manner that is opaque to the user.

2. The monitoring system of claim 1 wherein the commands derived by the data acquisition control engine include at least one command to mirror data from a first port of the at least one network switch to a second port, wherein the first port is identified by the at least one port number.

3. The monitoring system of claim 2 wherein the data mirrored to the second port is directed to the capture server.

4. The monitoring system of claim 2 wherein the command to mirror includes a command to mirror data according to a defined schedule.

5. The monitoring system of claim 2 wherein the command to mirror data includes a command to start mirroring data in response to an occurrence of a specific event.

6. The monitoring system of claim 1 wherein the data acquisition control engine includes data that maps ports on the at least one network switch according to at least one of: (a) The type of data traffic flowing through each port; (b) A device type that data on a given port originates from; and (c) An identification of a specific device that data on a given port originates from.

7. A method comprising:
   presenting a graphical user interface (GUI) to a user by a data acquisition control engine in a network such that the GUI conceals, from the user, mappings of at least one port number to particular devices;
   receiving, by the GUI presented by the data acquisition control engine, a data acquisition instruction from the user, wherein the data acquisition instruction specifies a data acquisition plan that comprises a Voice over Internet Protocol (VOIP) equipment identification (ID) and a Virtual Local Area Network (VLAN) ID;
   deriving, by the data acquisition control engine, commands to issue to one or more network switches in the network, including the at least one port number, wherein the at least one port number identifies at least one port and is based on the VOIP equipment ID and VLAN ID received, wherein the commands are based on the data acquisition plan, and wherein each of the one or more network switches serves as an intermediary to i) at least one data input stream arriving on the at least one port and ii) at least one data output stream; and transmitting, by the data acquisition control engine, the derived commands to the one or more network switches, wherein the transmitting of the derived commands causes the data acquisition plan to be implemented on the at least one port at the one or more network switches.

8. The method of claim 7 further comprising:

mirroring data from at least one data source port to at least one destination port in response to the transmitted commands, wherein the at least one data source port is identified by the at least one port number.

9. The method of claim 8 further comprising:

transmitting the mirrored data to a capture server in the network.

10. The method of claim 9 further comprising:

storing the transmitted data by the capture server.

11. The method of claim 10 further comprising:

associating the stored data with the specified data acquisition plan and with the user who submitted the data acquisition plan, in a database accessible to the capture server.

12. The method of claim 9 wherein the mirroring step comprises:

obtaining data from a specific port of a specific network switch in accordance with the data acquisition plan.

13. The method of claim 9 wherein the mirroring step comprises:

obtaining data from a specific device within the network in accordance with the data acquisition plan.

14. The method of claim 9 wherein the mirroring step comprises:

acquiring data over a time period having start and end times specified in the data acquisition plan.

15. The method of claim 9 wherein the mirroring step comprises:

starting to acquire data based on the occurrence of a particular event specified in the data acquisition plan.

16. A data acquisition control engine for monitoring a network, comprising:

a database to store data describing network elements within the network and links interconnecting the network elements;

a graphical user interface (GUI) configured to receive information from a user specifying one or more data acquisition operations for the network, the received information comprising a Voice over Internet Protocol (VOIP) equipment identification (ID) and a Virtual Local Area Network (VLAN) ID;

a processor configured to access the database and to transmit a data acquisition instruction corresponding to a specified data acquisition operation specified in the database; and a first network link for connecting the data acquisition control engine to a network element of the network elements, and configured to convey the data acquisition instruction to the network element, wherein the data acquisition instruction instructs the network element to mirror data arriving on a port at the network element, wherein the identification number of the port is based on the VOIP equipment ID and VLAN ID received, and wherein mapping of the identification number of the port to a particular device is concealed from the user.

17. The data acquisition control engine of claim 16 further comprising:

a second network link for connecting the data acquisition control engine to a capture server, and configured to convey the data acquisition instruction to a capture engine.

18. The data acquisition control engine of claim 16 wherein the processor is configured to transmit the data acquisition instruction in response to manual input to the GUI from a user.

19. The data acquisition control engine of claim 16 wherein the database is configured to store schedules for conducting data acquisition operations.

20. The data acquisition control engine of claim 19 wherein the processor is configured to transmit the data acquisition instruction to the capture server in accordance with the schedules stored in the database.

21. The data acquisition control engine of claim 16 wherein the processor is configured to initiate a data acquisition operation upon detecting an occurrence of a pre-defined condition.

22. The data acquisition control engine of claim 16 wherein the processor is configured to halt a data acquisition operation based on the occurrence of a pre-defined condition.

23. The data acquisition control engine of claim 16 wherein the processor is configured to halt a data acquisition operation based on the occurrence of an overload condition in the network.

\* \* \* \* \*